(12) United States Patent
Cameron et al.

(10) Patent No.: US 8,170,539 B2
(45) Date of Patent: May 1, 2012

(54) MESSAGING WITH PROPRIETARY ATTRIBUTES

(75) Inventors: Jeffrey M. Cameron, Omaha, NE (US); Bradley T. Kenyon, Omaha, NE (US); James A. Lamb, Omaha, NE (US); Hans A. Askerup, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 11/442,880

(22) Filed: May 30, 2006

(65) Prior Publication Data

US 2007/0281677 A1 Dec. 6, 2007

(51) Int. Cl.
*H04M 3/00* (2006.01)
*H04M 1/725* (2006.01)

(52) U.S. Cl. ..................... 455/419; 455/412.2
(58) Field of Classification Search ............... 455/412.1, 455/418, 419, 412.2
See application file for complete search history.

(56) References Cited

U.S. PATENT DOCUMENTS

| 5,517,562 | A | 5/1996 | McConnell | |
|---|---|---|---|---|
| 2004/0259534 | A1* | 12/2004 | Chaudhari et al. | 455/414.1 |
| 2005/0063417 | A1* | 3/2005 | Berranger | 370/465 |
| 2005/0278447 | A1 | 12/2005 | Raether et al. | |
| 2006/0025133 | A1 | 2/2006 | Shaheen | |
| 2006/0067338 | A1* | 3/2006 | Hua et al. | 370/400 |
| 2007/0100859 | A1* | 5/2007 | Holmes et al. | 707/101 |

FOREIGN PATENT DOCUMENTS

WO WO-9844715 A 10/1998

OTHER PUBLICATIONS

PCT ~ Notification Concerning Transmittal of Copy of International Preliminary Report on Patentability (Chapter 1 of the PCT) ~ Dec. 18, 2008 ~ PCT/US2007/012438.
PCT International Search Report ~ dated Nov. 21, 2007 ~ PCT/US2007/012438.

* cited by examiner

*Primary Examiner* — Christopher M Brandt

(57) ABSTRACT

Methods, computer readable media, and system embodiments are provided for messaging with proprietary attributes. A method embodiment includes storing a particular proprietary attribute for a mobile service feature in a datastore of a telecommunications system. The method includes receiving a configuration for a mobile service from a service provider to the datastore, the configuration including the mobile service feature. The method also includes transmitting a message for the mobile service from the datastore through the telecommunications system, the message including the particular proprietary attribute.

17 Claims, 4 Drawing Sheets

MESSAGING WITH PROPRIETARY ATTRIBUTES

BACKGROUND

In the field of telecommunications, individuals can subscribe to mobile services offered by a number of different service providers. For example, an individual can subscribe to a particular mobile service for their mobile phone that is offered by a particular service provider. An individual often makes this decision based upon the features offered by the service provider and/or the service's compatibility with the individual's device. A service provider can provide mobile services through a telecommunications system. A telecommunications system can include various functions which can work together to provide mobile services to subscribers.

When a telecommunications device or system is designed, it is designed such that a service provider using the system can offer mobile services with particular features. In some instances, a service provider may desire to change the features that are available with a mobile service. For example, a service provider may desire to add a call forwarding feature to a particular mobile service based upon user requests or compatibility with a particular wireless device, among other reasons. However, changing these telecommunications devices or systems may involve the designer of the system, device, or software applications thereon having to customize the device, system, or software, for the particular service provider. This may involve visits from the designer or specialized instructions to be written, which can be expensive and time-consuming.

DETAILED DESCRIPTION

Embodiments of the present disclosure include methods, computer readable media, and systems for messaging with proprietary attributes. An exemplary method embodiment includes storing a particular proprietary attribute for a mobile service feature in a datastore of a telecommunications system. The method includes receiving a configuration for a mobile service from a service provider to the datastore, the configuration including the mobile service feature. The method also includes transmitting a message for the mobile service from the datastore through the telecommunications system, the message including the particular proprietary attribute. Service providers can use embodiments of the present disclosure to change the features that are available with a mobile service without designer interaction or specialized software having to be written.

Embodiments of the present disclosure and features thereof can be performed by software, firmware, hardware, application modules, and the like. These embodiments can use instructions resident on and/or executable by circuits such as Application Specific Integrated Circuits (ASICs), devices, systems, or networks shown herein or otherwise.

The embodiments of the present disclosure are not limited to any particular operating environment or to instructions written in any particular programming language. Software, firmware, and/or processing modules, suitable for carrying out embodiments of the present disclosure, can be resident on one or more devices in one or more locations.

Figure 1:
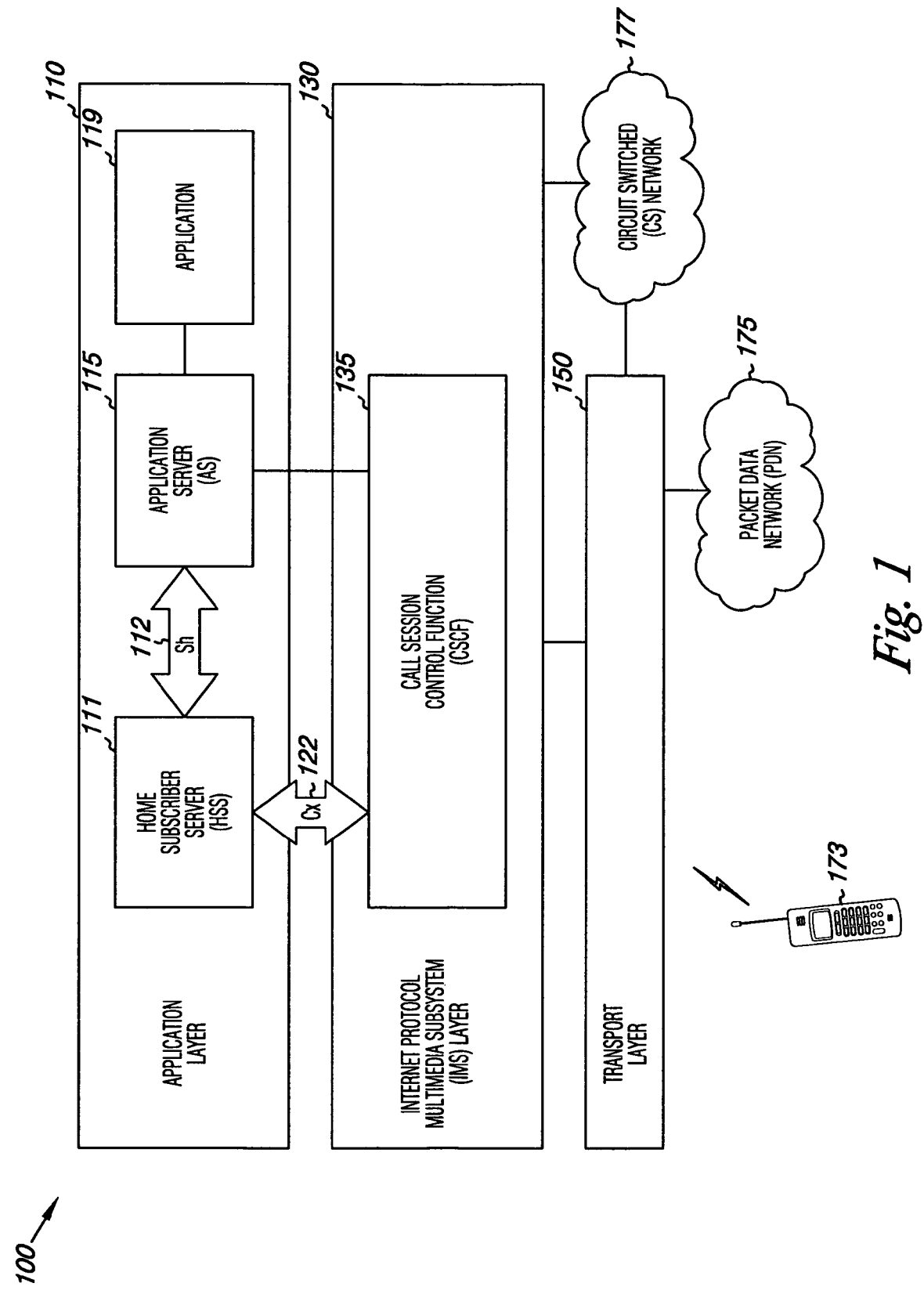
FIG. 1 is a block diagram illustrating an embodiment of a subsystem in a telecommunications system suitable to implement embodiments of the present disclosure.

FIG. 1 is a block diagram illustrating an embodiment of a subsystem 100 in a telecommunications system suitable to implement embodiments of the present disclosure. In FIG. 1, each block represents one or more functions, which can be performed by hardware and/or software.

In the embodiment of FIG. 1, the subsystem 100 is an Internet Protocol (IP) Multimedia Subsystem (IMS). In the subsystem 100, instructions can execute to use IP to provide mobile services under standards of the 3rd Generation Partnership Project (3GPP). However, in some embodiments of the present disclosure, the subsystem 100 can be a subsystem for various telecommunication systems, using other protocols and/or standards.

In the embodiment illustrated in FIG. 1, the subsystem 100 includes an application layer 110, an IMS layer 130, and a transport layer 150. In the application layer 110, instructions can execute to store and process data for mobile services. The application layer 110 in the embodiment of FIG. 1 includes a Home Subscriber Server (HSS) 111, an Application Server (AS) 115, and an application 119. In some embodiments of the present disclosure, the HSS 111 can, for example, be an HSS 201 of the embodiment of FIG. 2. The application layer 110 can also include additional HSSs, ASs, and applications, as well as other system functions, such as a Subscriber Locator Function (SLF), among others.

Functions of the application layer 110 can communicate with each other. For example, instructions can execute so that the HSS 111 can communicate with other system functions using interfaces of a DIAMETER type protocol, such as Cx, Dx, and Sh interfaces. For instance, the HSS 111 can communicate with the AS 115 using an Sh interface 112. In some embodiments, the Sh interface 112 can be a Sh interface 262 in the embodiment of FIG. 2. In various embodiments, instructions can execute so that the AS 115 can communicate with other system functions, including the application 119.

Functions of the application layer 110 can communicate with functions of the IMS layer 130. For example, the HSS 111 can communicate with a Call Session Control Function (CSCF) 135 of the IMS layer 130 using a Cx interface 122. In some embodiments, the Cx interface 122 can be a Cx interface 261 in the embodiment of FIG. 2.

In various embodiments, the AS 115 can also communicate with the CSCF 135. In some embodiments, the IMS layer 130 can execute instructions to route calls and sessions for mobile services. In the embodiment of FIG. 1, the IMS layer 130 includes the CSCF 135. The CSCF 135 can include a Proxy-CSCF (P-CSCF), an Interrogating-CSCF (I-CSCF), and a Serving-CSCF (S-CSCF).

The IMS layer 130 can also include one or more other system functions such as a Breakout Gateway Control Function (BGCF), a Media Gateway Control Function (MGCF), a Signaling Gateway (SGW), a Policy Decision Function (PDF), a Network Attachment Subsystem (NASS), and a Resource and Administration Control Function (RACF). In various embodiments, instructions can execute so that functions of the IMS layer 130 can communicate with each other.

In some embodiments, functions of the IMS layer 130 can communicate with external networks. In such embodiments, instructions can execute so that one or more functions of the IMS layer 130 can communicate with a Circuit Switched (CS) Network 177. For example, instructions can execute so that the CSCF 135 can communicate with the CS Network 177 through a MGCF and a SGW of the IMS layer 130.

In some embodiments, instructions can execute so that functions of the IMS layer 130 can communicate with functions of the transport layer 150. In the embodiment of FIG. 1, the transport layer 150 can execute instructions to connect user equipment (UE) 173 and external networks to mobile services of the subsystem 100.

In various embodiments, the transport layer 150 can connect various UE 173, such as mobile phones, personal digital assistants (PDAs), Blackberry devices, computers, and other UE, to mobile services provided by the subsystem 100. As illustrated in the embodiment of FIG. 1, the transport layer 150 can connect a Packet Data Network (PDN) 175, the CS Network 177, and other networks to mobile services provided by the subsystem 100.

In such embodiments, the transport layer 150 can provide various connections for UE 173 and external networks. For example, the transport layer 150 can execute instructions to provide fixed connections (e.g., DSL, cable, Ethernet, etc.), mobile, connections (e.g., W-CDMA, CDMA2000, GSM, GPRS, etc.), and wireless connections (e.g., WLAN, WiMAX, etc.). Some embodiments can include instructions to provide connections between the transport layer 150 and non-IMS compatible systems (e.g., POTS, H.323, etc.) through various gateway (GW) functions.

In various embodiments, the transport layer 150 can include various system functions. For example, the transport layer 150 can include one or more of various system functions to connect to the UE 173 such as a Radio Access Network (RAN), a Serving General Packet Radio Service (SGPRS), a Gateway GPRS Support Node (GGSN), a Policy Enforcement Function (PEF), a Wireless Local Area Network Wireless Access Gateway (WLAN WAG), a WLAN Packet Data Gateway (PDG), a Digital Subscriber Line Access Multiplexer (DSLAM), a Broadcast Auxiliary Service (BAS), and an IP network Back Bone (BB).

In some embodiments, the transport layer 150 can also include one or more of various system functions to connect to external networks such as an IMS Media Gateway (MGW), a Breakout Gateway (BG), and an IP network Back Bone (BB), among others. In various embodiments, the transport layer 150 can include one or more of various system functions to connect to the IMS layer 130, such as a Media Resource Function (MRF) and an IMS GW. Instructions can execute so that functions of the transport layer 150 can communicate with each other.

Figure 2:
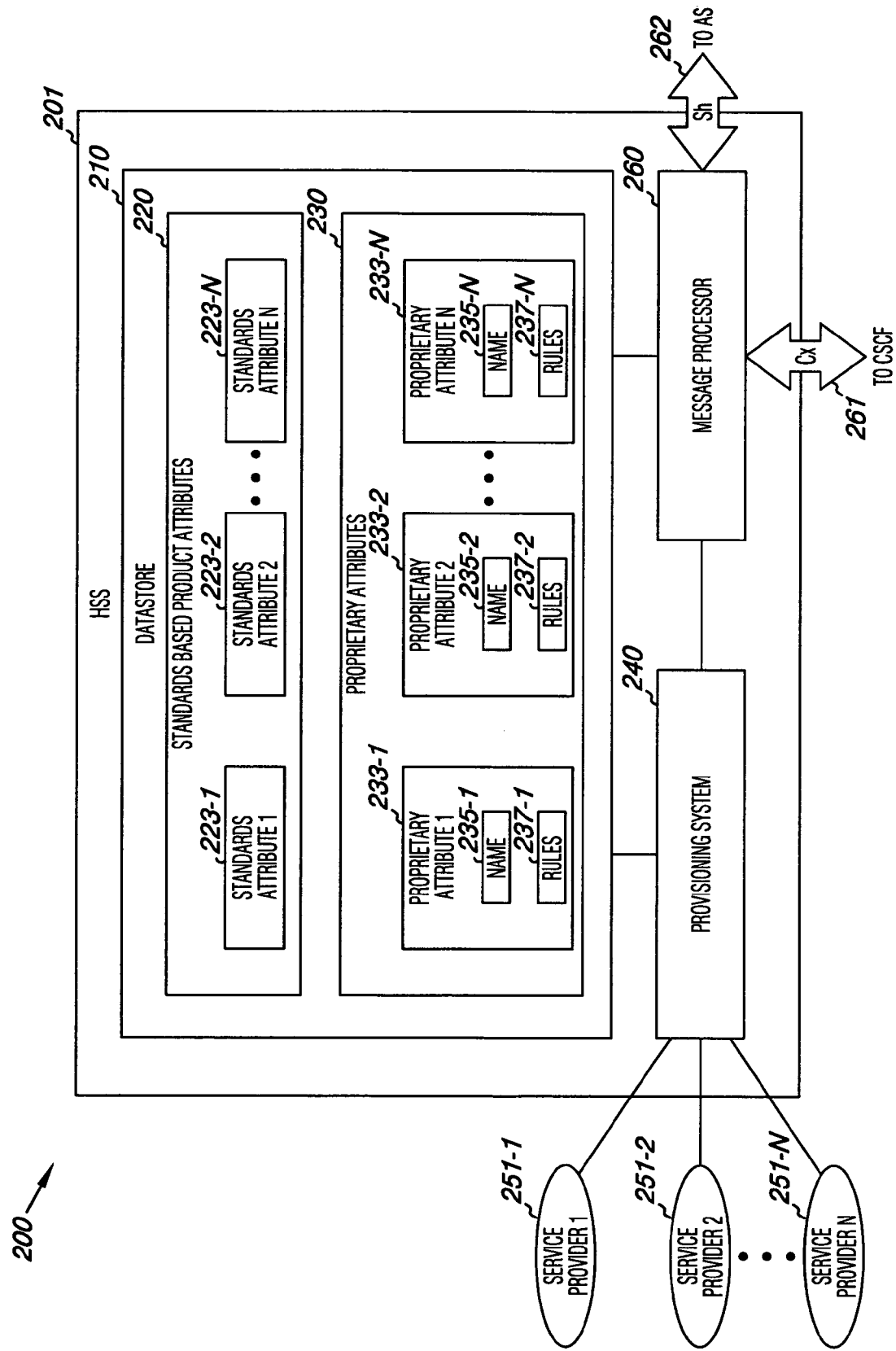
FIG. 2 is a block diagram illustrating an embodiment of a database in a telecommunications system suitable to implement embodiments of the present disclosure.

FIG. 2 is a block diagram 200 illustrating an embodiment of a database in a telecommunications system suitable to implement embodiments of the present disclosure. In the embodiment of FIG. 2, the telecommunications system includes an IMS subsystem, such as the subsystem 100 of the embodiment of FIG. 1, which uses IP to provide mobile services under 3GPP standards.

However, in some embodiments of the present disclosure, the telecommunication systems can use other protocols and/or standards. In the embodiment of FIG. 2, each block represents one or more functions, which can be performed by hardware and/or software.

In the embodiment of FIG. 2, the block diagram 200 includes an HSS 201. In some embodiments of the present disclosure, the HSS 201 can be the HSS 111 of the embodiment of FIG. 1.

In the embodiment of FIG. 2, a first service provider 251-1, a second service provider 251-2, and an Nth service provider (where "N" represents any number) interact with the HSS 201. In such embodiments, instructions can execute so that the HSS 201 can communicate with a CSCF, such as the CSCF 135 in the embodiment of FIG. 1 for example, by using the Cx interface 261, which can, in some embodiments, be the Cx interface 122 of the embodiment of FIG. 1. In various embodiments, instructions can execute so that the HSS 201 can communicate with an AS, such as the AS 115 in the embodiment of FIG. 1, using the Sh interface 262, which can, in some embodiments, be the Sh interface 112 of the embodiment of FIG. 1.

The HSS 201 includes various functions. For example, the HSS 201 includes a datastore 210, a provisioning system 240, and a message processor 260. The HSS 201 also can, in various embodiments, include additional datastores, provisioning systems, and message processors. The HSS 201 can include various other functions for mobile services, such as storing subscriber profiles, performing Authentication, Authorization, and Accounting (AAA) functions, and performing Home Location Register (HLR) functions.

In the embodiment of FIG. 2, the datastore 210 of the HSS 201 includes a first datastore location 220 and a second datastore location 230. In such embodiments, instructions can execute to store in the first datastore location 220 standards based product attributes including a first standards based attribute 223-1, a second standards based attribute 223-2, and an Nth standards based attribute 223-N.

Standards based product attributes include instructions for providing mobile services under the standards of a particular telecommunications system. As examples, in some embodiments standards based product attributes can include instructions for providing mobile services under the standards of the 3GPP, the 3rd Generation Partnership Project 2 (3GPP2), the Internet Engineering Task Force (IETF), the Telecommunications Industry Association (TIA), the Alliance for Telecommunications Industry Solutions (ATIS), the Telecommunication and Internet converged Services and Protocols for Advanced Network (TISPAN), and the International Telecommunication Union (ITU) Telecommunication Standardization Sector (ITU-T), among others.

In the embodiment of FIG. 2, the second datastore location 230 is separate from the first datastore location 220. In such embodiments, instructions can execute to store proprietary attributes in the second datastore location 230. For example, a first proprietary attribute 233-1, a second proprietary attribute 233-2, and an Nth proprietary attribute 233-N can be stored therein, among others.

In some embodiments, instructions can execute to link the proprietary attributes 233-1 through 233-N with a common identifier. Proprietary attributes can include instructions for providing proprietary mobile service features through a telecommunications system.

In such embodiments, instructions can execute, for example, to associate each of the proprietary attributes 233-1 through 233-N with a particular mobile service feature provided through the telecommunication system such as illustrated in the embodiment of FIG. 2. For example, instructions can execute to associate the first proprietary attribute with a call-forwarding mobile service feature. More than one of the proprietary attributes can be associated with the same particular mobile service feature, in various embodiments.

In some embodiments, for each of the proprietary attributes, instructions can execute to assign a name. For example, in the embodiment of FIG. 2, instructions can execute to assign a first name 235-1 to the first proprietary attribute 233-1, to assign a second name 235-2 to the second proprietary attribute 233-1, and to assign an Nth name 235-N to the Nth proprietary attribute 233-N.

In various embodiments, instructions can execute to map such a name to an element in a set of pre-defined physical datastore labels. Such mapping can be used to locate a proprietary attribute in the second datastore location, such as datastore location 230.

In some embodiments, for each of the proprietary attributes, instructions can execute to associate a set of provisioning validation rules. For example, with respect to the embodiment of FIG. 2, instructions can execute to associate a first set of provisioning validation rules 237-1 with the first proprietary attribute 233-1, to associate a second set of provisioning validation rules 237-2 with the second proprietary attribute 233-2, and to associate an Nth set of provisioning validation rules 237-N with the Nth proprietary attribute 233-N.

In some embodiments, instructions can execute to associate a set of provisioning validation rules with a particular proprietary attribute from among a number of proprietary attributes, such as the proprietary attributes 233-1 through 233-N of FIG. 2. Provisioning validation rules can include various conditions such as maximum and minimum values, enumerated lists, Boolean value checks, maximum string lengths, valid character content, etc.

In the embodiment of FIG. 2, the provisioning system 240 can communicate with the datastore 210. For example, instructions can execute so that the provisioning system 240 can access the proprietary attributes 233-1 through 233-N stored in the second datastore location 230. In such embodiments, instructions can execute so that the provisioning system 240 can provide provisioning services for the sets of provisioning validation rules of the proprietary attributes 233-1 through 233-N. In the embodiment of FIG. 2, the provisioning system 240 can also communicate with the message processor 260.

In the embodiment of FIG. 2, the provisioning system 240 can communicate with each of the service providers 251-1 through 251-N. In such embodiments, instructions can execute to receive a configuration for a particular mobile service that includes a particular mobile service feature from a particular service provider, from among the service providers 251-1 through 251-N, to the provisioning system 240. As an example, the provisioning system 240 can receive a configuration for a mobile service that includes a call-forwarding mobile service feature from the first service provider 251-1.

In some embodiments, instructions can execute to define one or more service provider specific attributes from among a number of proprietary attributes, such as the proprietary attributes 233-1 through 233-N of FIG. 2, based on a configuration received from a service provider. In such embodiments, instructions can execute to use such a configuration to select one or more of the proprietary attributes as the service provider specific attributes. Service provider specific attributes can include selected proprietary attributes and can be used for proprietary mobile service features offered by a specific service provider.

For example, in the embodiment of FIG. 2, in response to receiving a configuration from the first service provider 251-1 through the provisioning system 240 for a mobile service that includes a call-forwarding mobile service feature, instructions can execute to select from the proprietary attributes 233-1 through 233-N the first proprietary attribute 233-1, which is associated with the call-forwarding mobile service feature, and to define the first proprietary attribute 233-1 as a service provider specific attribute for the first service provider 251-1. In some embodiments, instructions can execute to load such a configuration from a service provider at a run-time for the mobile service being configured.

In various embodiments, the proprietary attributes 233-1 through 233-N can be modified. For example, instructions can execute to modify a particular proprietary attribute, such as a service provider specific attribute, in response to a modification request received from a service provider, such as the service providers 251-1 through 251-N of the embodiment of FIG. 2.

In such embodiments, instructions can execute to modify a proprietary attribute by applying a set of provisioning validation rules associated with the proprietary attribute. For example, instructions can execute to modify the first proprietary attribute 233-1 in response to a modification request received from the first service provider 251-1, by applying a set of provisioning validation rules.

In some embodiments, data in the proprietary attributes 233-1 through 233-N can be changed. For example, instructions can execute to monitor a particular proprietary attribute for a data change. In such embodiments, instructions can execute to notify one or more system functions of such a data change, among other mechanisms.

As an example, instructions can execute to monitor the second proprietary attribute for a data change, and in response to detecting a data change, notify a CSCF, such as the CSCF 135 in the embodiment of FIG. 1. In some embodiments, such monitoring instructions can be associated with the message processor 260. Also, in such an example, instructions can execute to notify the CSCF by communicating using an interface of the DIAMETER protocol, such as the Cx interface 261 of FIG. 2, among other methods. In various embodiments, such notifying instructions can execute to communicate the notification through the message processor 260.

In the embodiment of FIG. 2, the message processor 260 can communicate with the datastore 210. For example, in some embodiments, instructions can execute to transmit one or more of the proprietary attributes 233-1 through 233-N from the second datastore location 230 to the message processor 260. In various embodiments, these transmitted proprietary attributes can be service provider specific attributes.

In the embodiment of FIG. 2, the message processor 260 can process a proprietary attribute, such as the proprietary attributes 233-1 through 233-N or a service provider specific attribute, into a message from the HSS 201. In various embodiments, the processed message can be a message of an interface of the DIAMETER protocol under 3GPP standards.

As an example, instructions can execute to process a proprietary attribute into a Cx message of the Cx interface to be transmitted to a CSCF, such as the CSCF 135 in the embodiment of FIG. 1. As another example, instructions can execute to process a proprietary attribute into a Sh message of the Sh interface (e.g., interface 262) to be transmitted to an AS, such as the AS 115 in the embodiment of FIG. 1. In some embodiments, instructions can execute so that the message processor (e.g., processor 260) can process a proprietary attribute into an Attribute Value Pair (AVP), such as a standards based AVP or a service provider's proprietary AVP, in a message.

To accomplish this, the message processor 260 can be designed to process a proprietary attribute in various forms. As examples, instructions can execute so that the message processor 260 can process a proprietary attribute, as an AVP or an eXtensible Markup Language (XML) element, into a message.

In some embodiments, instructions can execute to process multiple data elements of a proprietary attribute as a single object, such as a .DLL file, into a message. In such embodiments, instructions can execute upon receipt of the message to use an object interface, such as software for communicating between two entities, to process the single object and to return the multiple data elements from the single object.

In various embodiments, instructions can execute so that the message processor can process a proprietary attribute into a message from the HSS, along with a separate communication in the message. For example, in the embodiment of FIG. 2, instructions can execute to use the message processor 260 to process a proprietary attribute, along with one or more standards based data elements, into a message from the HSS 201.

In various embodiments, instructions can execute so that the message processor processes a proprietary attribute into a message using a set of processing rules specific to a system function in the telecommunications system. As an example, instructions can execute to use a set of processing rules specific to a CSCF, such as the CSCF 135 in the embodiment of FIG. 1, to process a proprietary attribute into a Cx message for the CSCF. As another example, instructions can execute to use a set of processing rules specific to an AS, such as the AS 115 in the embodiment of FIG. 1, to process a proprietary attribute into an Sh message for the AS.

In various embodiments, the HSS 201 can communicate a message processed by the message processor 260 through a telecommunications system. In such embodiments, instructions can execute, for example, to transmit such a message, which includes one or more proprietary attributes for one or more mobile service features, from the HSS 201 to one or more system functions in a telecommunications system.

As an example, instructions can execute to transmit a message with proprietary attributes from the HSS 111, as a Cx message through the Cx interface 122, to the CSCF 135 of the embodiment of FIG. 1. As another example, instructions can execute to transmit a message with proprietary attributes from the HSS 111, as an Sh message through the Sh interface 112, to the AS 115 of the embodiment of FIG. 1. In such embodiments, instructions can execute so that various system elements, such as the CSCF 135 and/or the AS 115 can use one or more proprietary attributes in a message processed by the message processor 260 to provide one or more particular mobile service features with a mobile service.

Such embodiments can provide a number of benefits. For example, service providers can use embodiments such as those illustrated in FIGS. 1 and 2 to change the features that are available with a mobile service without investing the time and expense to customize telecommunications software.

Figure 3:
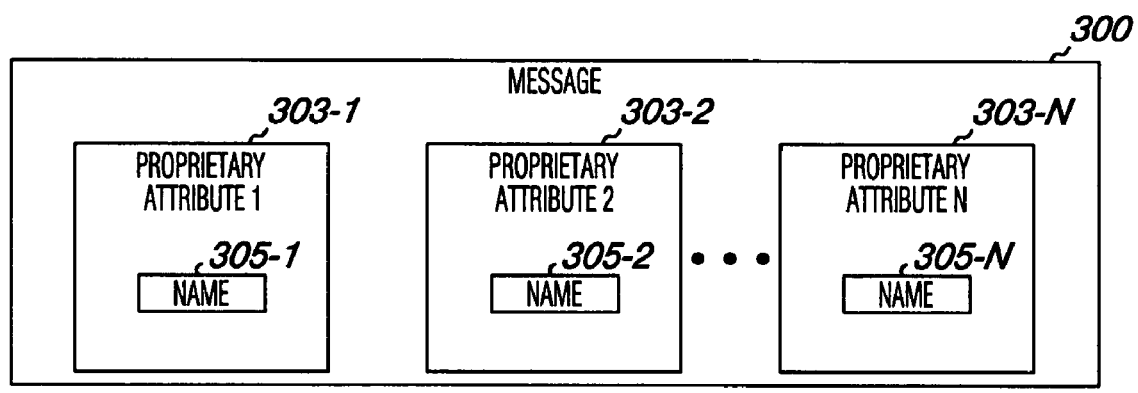
FIG. 3 is a block diagram illustrating an embodiment of a telecommunications message with proprietary attributes according to embodiments of the present disclosure.

FIG. 3 is a block diagram illustrating an embodiment of a telecommunications message 300 with proprietary attributes according to various embodiments of the present disclosure. In various embodiments, the message can be a message of an interface of the DIAMETER protocol under 3GPP standards, as described in connection with the embodiment of FIG. 2.

In the embodiment of FIG. 3, the message 300 includes a first proprietary attribute 303-1, a second proprietary attribute 303-2, and an Nth proprietary attribute 303-N. In various embodiments, one or more of the proprietary attributes 303-1 through 303-N can be one or more of the proprietary attributes 233-1 through 233-N, of the embodiment of FIG. 2.

In some embodiments, each of the proprietary attributes 303-1 through 303-N can be associated with a particular mobile service feature, can be assigned a name, and/or can be associated with a set of provisioning validation rules as described in connection with the embodiment of FIG. 2. For example, with reference to the embodiment of FIG. 3, instructions can execute to associate each of the proprietary attributes 303-1 through 303-N with a particular mobile service feature. As another example, with reference to the embodiment of FIG. 3, instructions can execute to assign a first name 305-1 to the first proprietary attribute 303-1, a second name 305-2 to the second proprietary attribute 303-2, and an Nth name 305-N to the Nth proprietary attribute 303-N.

Figure 4:
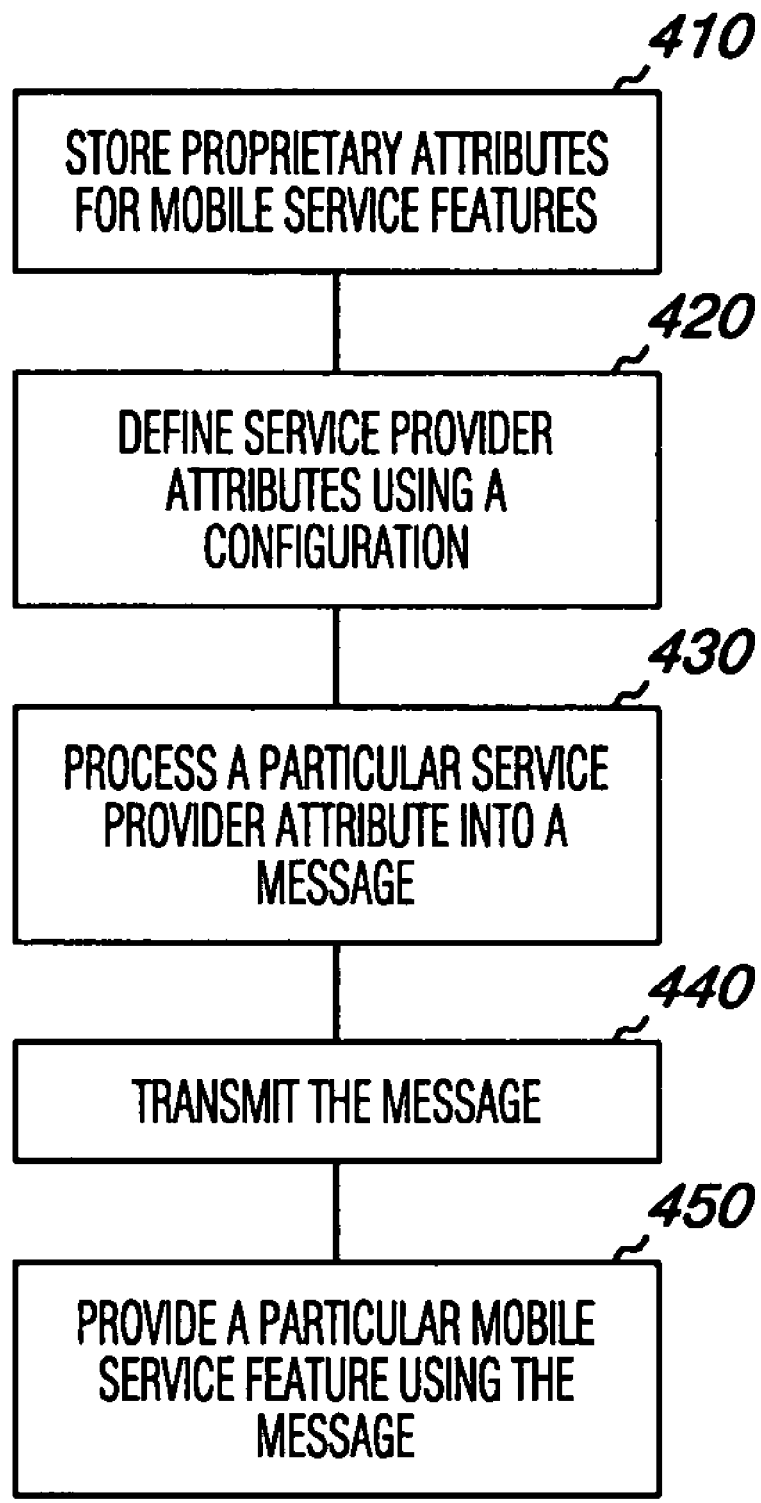
FIG. 4 is a block diagram illustrating an embodiment of a method of messaging with proprietary attributes according to embodiments of the present disclosure.

FIG. 4 is a block diagram illustrating an embodiment of a method of messaging with proprietary attributes according to various embodiments of the present disclosure. Elements of the method are not constrained to a particular order or sequence, unless otherwise stated. Additionally, some of the method elements, or portions thereof, can be performed at the same point in time.

Block 410 includes storing proprietary attributes for mobile services. In various embodiments, these proprietary attributes can be the proprietary attributes 233-1 through 233-N of the embodiment of FIG. 2, for example.

The embodiment of FIG. 4 also includes, at block 420, defining service provider specific attributes by using a configuration. For example, a service provider, such as the service providers 251-1 through 251-N of the embodiment of FIG. 2, can provide the configuration.

Block 430 includes processing a particular service provider specific attribute, such as those defined at block 420, into a message. For instance, the particular service provider specific attribute can be processed by the message processor 260, of the embodiment of FIG. 2, to be included in a message. In various embodiments, the message can be a message of an interface of the DIAMETER protocol under 3GPP standards, such as the message 300 of the embodiment of FIG. 3.

Block 440 includes transmitting the message processed at block 430. In such embodiments, the message can be transmitted in various ways, such as by using the Cx interface 122 and/or the Sh interface 112 of the embodiment of FIG. 1, among others.

The embodiment of FIG. 4 also includes, at block 450, providing a particular mobile service feature by using the message processed at block 430 and transmitted at block 440. For example, various system elements, such as the CSCF 135 and/or the AS 115, can use the particular service provider specific attribute in the message to provide the particular mobile service feature with a mobile service. As a result, service providers can use embodiments such as illustrated in FIG. 4, to change the features that are available with a mobile service without involvement of the designer of the device or system or the writing of specialized instructions.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
storing a plurality of proprietary attributes for a plurality of mobile service features in a datastore of a telecommunications system;
associating each of the plurality of propriety attributes with a different set of a plurality of sets of provisioning validation rules;
receiving a configuration for a mobile service from a service provider to the datastore, the configuration including a particular mobile service feature;
selecting a particular proprietary attribute associated with the particular mobile service feature from the plurality of propriety attributes by using the configuration;
transmitting a message for the mobile service from the datastore through the telecommunications system, the message including the particular proprietary attribute; and
modifying the particular proprietary attribute in response to a modification request from the service provider by identifying the set of provisioning validation rules associated with the particular proprietary attribute and applying the identified set of provisioning validation rules associated with the particular propriety attribute.

2. The method of claim 1, wherein storing includes storing in a home subscriber server.

3. The method of claim 1, including loading the configuration at a run-time for the mobile service.

4. The method of claim 1, including processing the particular proprietary attribute into a message that includes a separate communication.

5. The method of claim 1, wherein transmitting includes transmitting through an internet protocol multimedia subsystem telecommunications system.

6. The method of claim 1, wherein transmitting includes transmitting a $3^{rd}$ Generation Partnership Project standards based message.

7. The method of claim 1, including providing the mobile service with the mobile service feature by using the message.

8. A non-transitory computer readable medium, having instructions for causing a device to perform a method, comprising:
associating a number of proprietary attributes with a number of mobile service features, wherein each of the proprietary attributes is associated with a particular mobile service feature and a different set of a plurality of sets of provisioning validation rules;
storing the number of proprietary attributes in a home subscriber server;
defining a portion of the number of proprietary attributes as service provider specific attributes based on a configuration from a service provider;
associating a particular set of provisioning validation rules with a particular proprietary attribute from among the number of proprietary attributes; and
modifying the particular proprietary attribute in response to a modification request from the service provider by identifying the particular set of provisioning validation rules associated with the particular proprietary attribute and applying the identified particular set of provisioning validation rules.

9. The medium of claim 8, wherein the method includes:
storing at least one standards based product attribute in a first datastore location in the home subscriber server; and
storing at least one of the proprietary attributes in a second datastore location separate from the first datastore location in the home subscriber server.

10. The medium of claim 8, wherein the method includes providing provisioning services for the number of proprietary attributes through a provisioning system for the home subscriber server.

11. The medium of claim 8, wherein the method includes:
incorporating at least one service provider specific attribute in a message;
processing the message as a Cx message; and
providing the particular mobile service feature with the mobile service by communicating the message to a call session control function in a telecommunications system.

12. The medium of claim 8, wherein the method includes:
incorporating at least one service provider specific attribute in a message
processing the message as an Sh message; and
providing the particular mobile service feature with the mobile service by communicating the message to an application server in a telecommunications system.

13. The medium of claim 8, wherein the method includes:
incorporating at least one service provider specific attribute in a message;
processing the message to include a service provider specific attribute in an attribute value pair in the message, the attribute value pair selected from the group including:
a standards based attribute value pair; and
a proprietary attribute value pair.

14. The medium of claim 8, wherein the method includes:
incorporating at least one service provider specific attribute in a message;
processing the message to include a service provider specific attribute in a form selected from the group including:
an attribute value pair;
an extensible markup language element; and
a dynamically linked library file.

15. The medium of claim 8, wherein the method includes processing a message by using a set of processing rules specific to a system function selected from the group including:
a call session control function; and
an application server.

16. The medium of claim 15, wherein the method includes:
processing a message to include multiple data elements as a single object; and
processing the single object by using an object interface at the system function to return the multiple data elements.

17. An internet protocol multimedia subsystem, comprising:
a home subscriber server;
an application server;
a call session control function;
means to process a standards interface message to include a particular proprietary attribute associated with a particular mobile service feature, along with a separate communication and to transmit the message from the home subscriber server to a system function in the internet protocol multimedia subsystem selected from the group including:

the application server; and the call session control function, wherein the home subscriber server comprises a datastore for storing a plurality of proprietary attributes including the particular proprietary attribute, each proprietary attribute being associated with a different set of a plurality of sets of provisioning validation rules, and wherein the particular proprietary attribute is modifiable in response a modification request from a service provider by identifying the set of rules associated with the particular proprietary attribute and applying the identified set of provisioning validation rules.

* * * * *

UNITED STATES PATENT AND TRADEMARK OFFICE
CERTIFICATE OF CORRECTION

| | | |
|---|---|---|
| PATENT NO. | : 8,170,539 B2 | Page 1 of 1 |
| APPLICATION NO. | : 11/442880 | |
| DATED | : May 1, 2012 | |
| INVENTOR(S) | : Jeffrey M. Cameron et al. | |

It is certified that error appears in the above-identified patent and that said Letters Patent is hereby corrected as shown below:

In column 12, line 4, in Claim 17, delete "a" and insert -- to a --, therefor.

Signed and Sealed this
Twenty-seventh Day of November, 2012

David J. Kappos
*Director of the United States Patent and Trademark Office*